Aug. 3, 1943. P. E. WAUGH 2,325,925
DELAYED CLOSING AUTOMATIC WATER DISCHARGE VALVE
Filed April 5, 1939 4 Sheets-Sheet 1
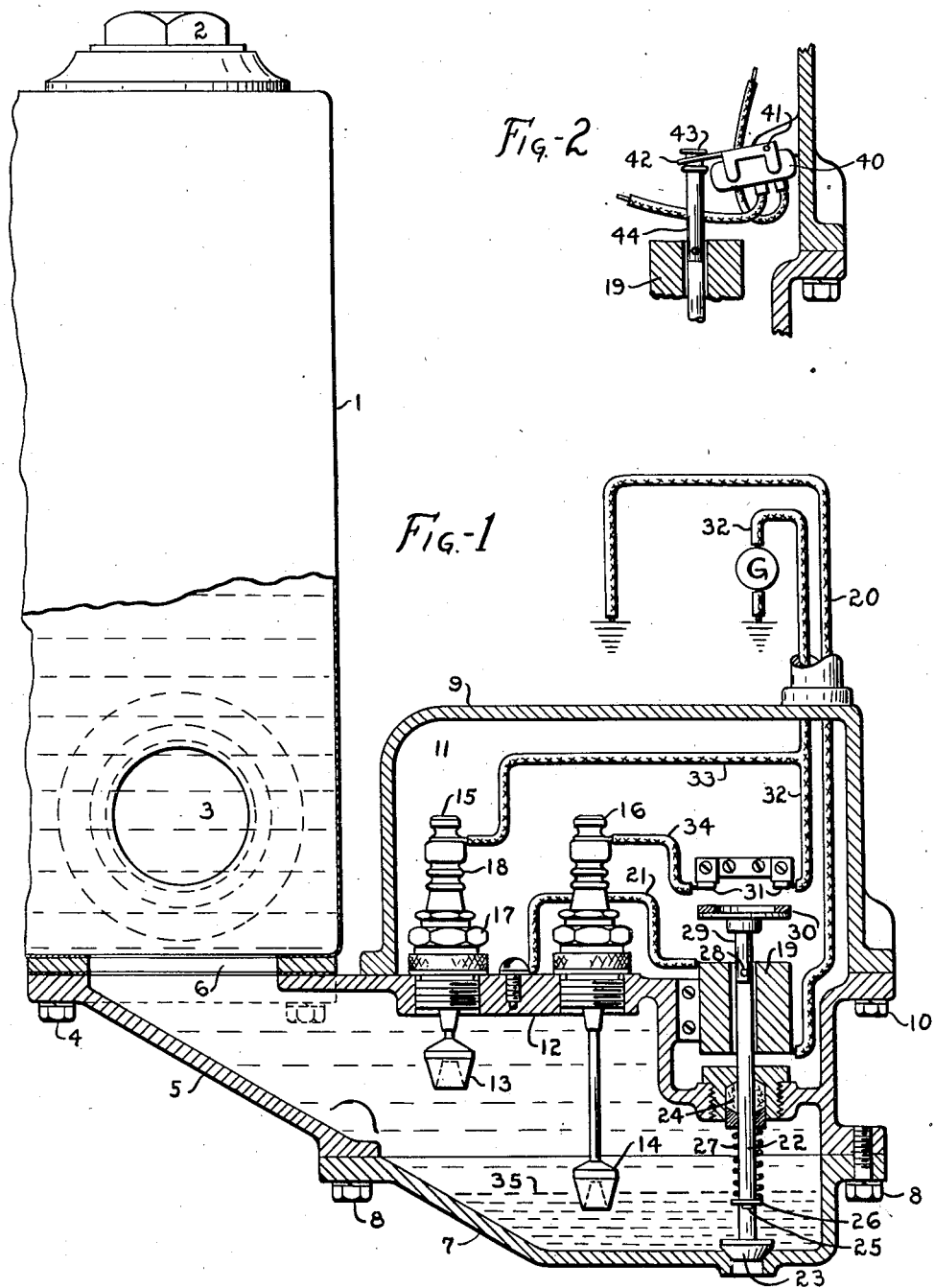
INVENTOR.
Paul E. Waugh
BY Cox & Moore
ATTORNEYS.

Aug. 3, 1943.                P. E. WAUGH                 2,325,925
            DELAYED CLOSING AUTOMATIC WATER DISCHARGE VALVE
                 Filed April 5, 1939            4 Sheets-Sheet 2
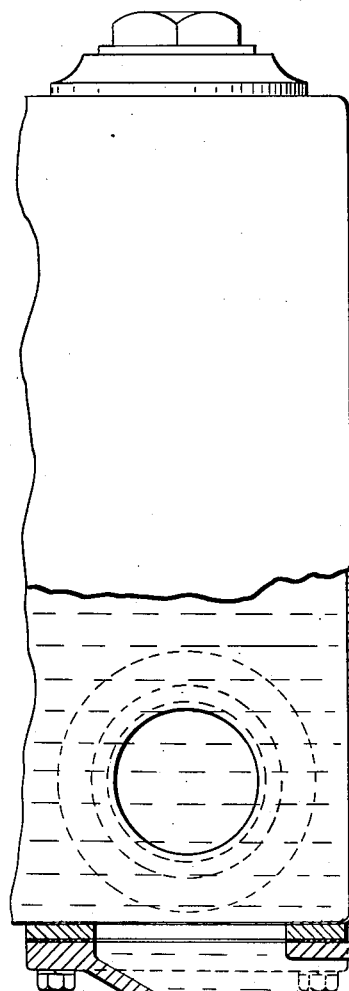
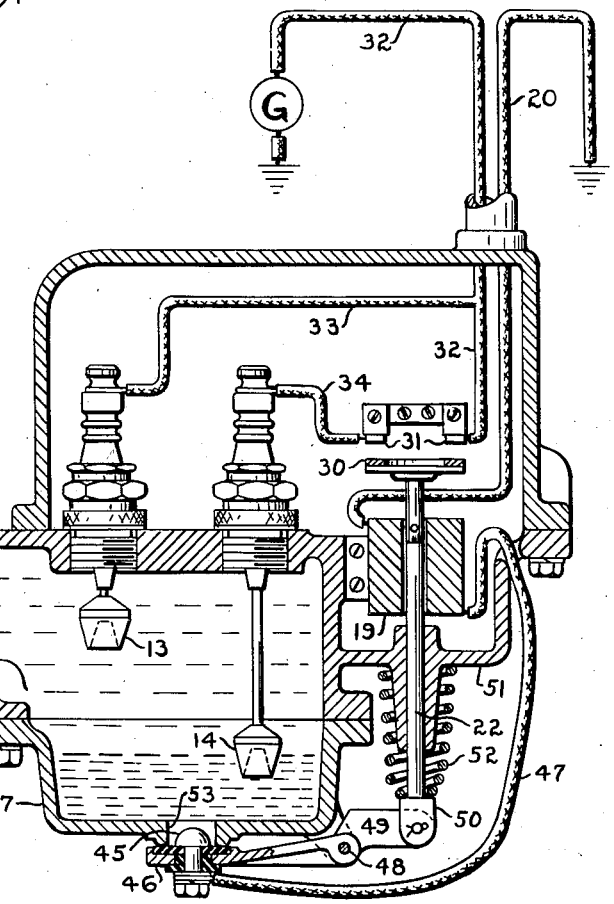
Fig. 3
INVENTOR.
Paul E. Waugh
BY: Cox & Moore
ATTORNEYS.

Aug. 3, 1943.   P. E. WAUGH   2,325,925
DELAYED CLOSING AUTOMATIC WATER DISCHARGE VALVE
Filed April 5, 1939   4 Sheets-Sheet 3
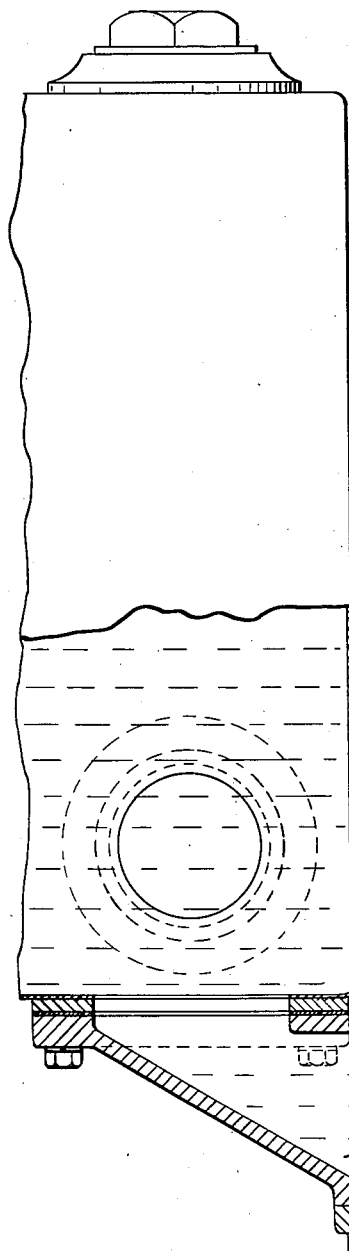
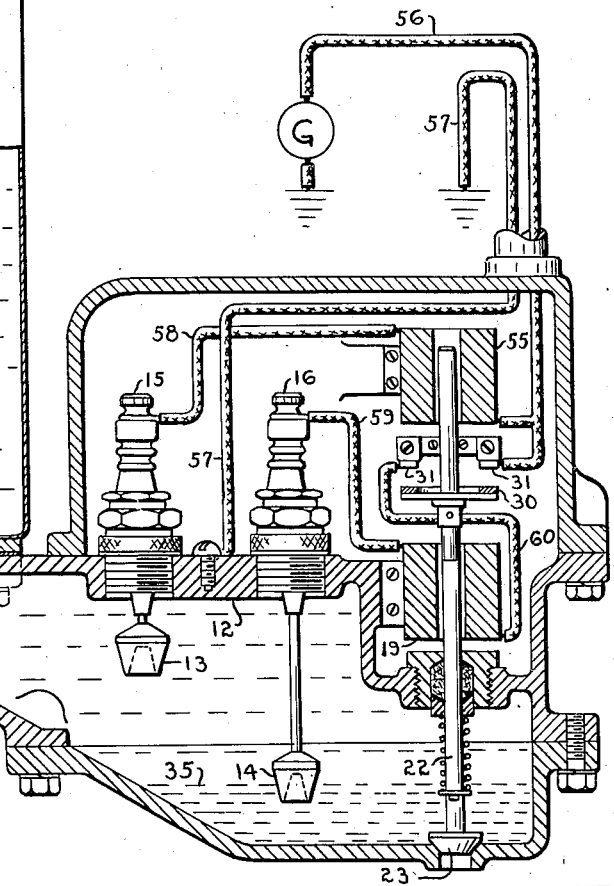
Fig.-4
INVENTOR.
Paul E. Waugh
BY: Cox & Moore
ATTORNEYS.

Aug. 3, 1943. P. E. WAUGH 2,325,925
DELAYED CLOSING AUTOMATIC WATER DISCHARGE VALVE
Filed April 5, 1939 4 Sheets-Sheet 4

INVENTOR.
Paul E. Waugh
BY Cox & Moore
ATTORNEYS.

Patented Aug. 3, 1943

2,325,925

UNITED STATES PATENT OFFICE 2,325,925

DELAYED CLOSING AUTOMATIC WATER DISCHARGE VALVE

Paul E. Waugh, Fort Wayne, Ind., assignor to Tokheim Oil Tank and Pump Company, Fort Wayne, Ind., a corporation of Indiana Application April 5, 1939, Serial No. 266,225

9 Claims. (Cl. 210—54)

This invention relates to an apparatus for automatically discharging water from tanks and containers adapted to hold petroleum products and/or internal combustion motor fuel, such as gasoline and the like.

Among the objects of the present invention are to provide an apparatus associated with a tank or reservoir adapted to contain petroleum products or internal combustion motor fuel in which water is adapted to accumulate from time to time, either by adulteration or condensation, and which water stratifies in a layer below the petroleum products or the motor fuel due to the heavier specific gravity of the water, and wherein it is desired to provide a valve controlled outlet for discharging the accumulated water without the possibility of discharging any of the supernatant petroleum products or motor fuel; to provide means for automatically discharging water which accumulates in the bottom of a reservoir containing petroleum products or motor fuel, such as gasoline, wherein a discharge valve is automatically operated by the rise of the level of accumulated water when it reaches a predetermined upper level, and wherein when the water level recedes, due to the opening of the water discharge means, such discharge means will not again close until the level of the water has dropped considerably below its opening level and yet wherein there will be also maintained a considerable body of water between the closing level of the water and the lower level in which the discharge valve is located, whereby such maintained body of water will also prevent the inadvertent discharge of the supernatant strata or body of petroleum product or motor fuel, such as gasoline; to provide means associated with a fuel tank or tank for holding petroleum products in an internal combustion engine driven vehicle, such as an airplane, marine craft, or automobile, wherein a fuel tank is subject to vibration, or wherein the level of liquid in the tank is subjected to changes in level, as for instance in an airplane, and wherein an automatically operating discharge valve is associated with the lowermost portion of the tank containing the petroleum or fuel, together with means disposed in said tank for automatically opening or closing the discharge valve due to substantially wide variations in the rise and fall of the accumulated water level within the tank, and wherein such automatic mechanism is not subject to operation due to fluctuations in the water level brought about by such vibration or the ordinary movements of the vehicle; to provide an automatic electrically operated means comprising a plurality of electrodes disposed within the water accumulating compartment of a tank or reservoir adapted to contain petroleum products or motor fuel, such as gasoline, associated with an automatically electrically operated discharge valve, together with switch mechanism operable automatically to discharge the water in such a way as to prevent the discharge of any supernatant petroleum products or gasoline, together with the water; to provide an apparatus of the foregoing type wherein the automatic discharge valve and all operating connections are disposed wholly outside of the water accumulating chamber so as to preclude the freezing of the valve in cold weather; to provide an apparatus of the foregoing character wherein the automatically operated discharge valve is operated by one or more solenoids and controlled by one or more electrical switches for fully insuring the automatic operation of the valve upon a predetermined substantial difference in the rise and fall of the accumulated water within the tank; to provide a service station equipment pump for dispensing internal combustion motor fuel, wherein during the dispensing operation, gasoline or other motor fuel is drawn from an underground reservoir and is caused to flow by suitable pumping means in a continuous stream through a separating means for automatically separating the water from the fuel as the fuel passes through the dispensing line, and wherein such motor fuel then passes through metering means and through a dispensing hose and nozzle, and wherein means is provided for automatically discharging water which has accumulated in the water separating means; to provide a device of the foregoing character wherein the means for discharging accumulated water is automatically operated upon the accumulation of a predetermined body of water to discharge the same, and wherein the discharge means is rendered inoperative when the water level drops to a predetermined distance below the water level at which the discharge means is provided for preventing the automatic opening of said discharge means during the operation of the pumping means or while the dispensing operation is taking place; to provide a service station pump with an automatic water discharging means for automatically discharging accumulated water from the system and wherein automatic means is provided for precluding the operation of the water discharging mechanism during a dispensing operation, that is, to permit the operation of the water discharging means only at times when no dispensing operation is being carried out, whereby to preclude any possibility of permitting internal or explosive motor fuel from being pumped through the discharge valve of the water separator; to provide a liquid dispensing pump having the usual type of switch control lever for the motor for pumping liquid through the flow line during the dispensing operation, and wherein means is associated with said lever not only for starting or stopping the motor driven pump but likewise to render operative or inoperative the automatic discharge valve for water accumulating within the water separator of the pump; to provide such nozzle supporting lever with connections not only to the motor for the pump of the service station apparatus, but also with a switch controlling the operation of the electrically operated automatic discharge valve of the water separator, the arrangement being such that when the motor is in operation the electrically operated water discharge mechanism will be rendered inoperative and vice versa; to provide a liquid dispensing system for a gasoline service station pump wherein a water separator is inserted in the liquid dispensing line in advance of the pump, whereby fuel will be drawn from the underground tank through the water separator and drawn through the pump and forced through the meter and thence through the dispensing line and out through the flexible hose and nozzle, and wherein the water separator is provided with a water accumulating chamber at its lowermost point; to provide electrically operated means associated with the discharge valve whereby when a petroleum product or other liquid, which is not a conductor of electricity flows over the valve such means will cause the instantaneous closing of such valve; and to provide these and other objects of invention as will be apparent from a perusal of the following specification when taken in connection with the drawings.

Referring now to the drawings in detail:

Fig. 1 represents a side view partly in section of one form of my invention showing a container for liquids having different specific gravity, one of which liquids is a conductor of electricity and the other of which is not;

Fig. 2 is a view of an improved type of mercury switch adapted to be used in lieu of the switch shown in Fig. 1;

Fig. 3 is a view showing a modified form of the invention wherein all moving parts are disposed outside of the liquid chamber;

Fig. 4 is still another modification showing an electrical arrangement employing two solenoids in associated circuits;

Figure 6:
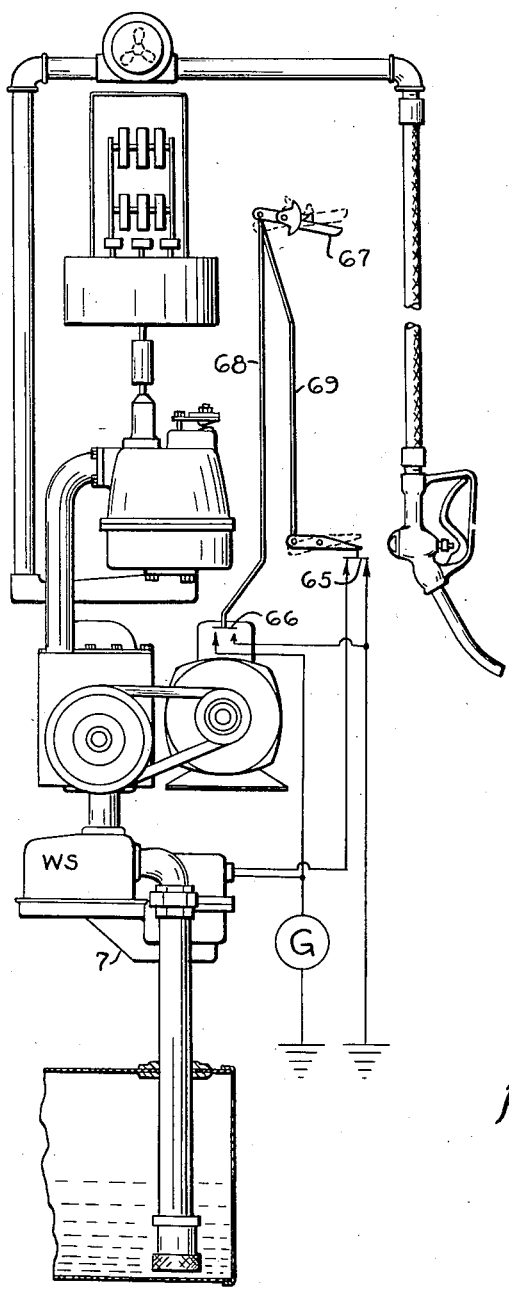
Fig. 6 is a somewhat schematic view showing the arrangement of the electrical connections of the device in relation to the electric motor in the gasoline pump shown in Fig. 5.

Referring now to the invention in general, the same comprises in one aspect thereof means associated with a container or reservoir adapted to hold a liquid inherently a nonconductor of electricity and from which one desires to separate another liquid of heavier specific gravity and which is a conductor of electricity. Specifically, the invention relates to means for separating water from petroleum products and even more specifically is concerned with the separation of water from liquid fuel for internal combustion engines. Such fuel, for instance, being gasoline, but obviously not limited to gasoline. In this broader aspect of the invention, the water may either be intrained in the gasoline or the gasoline may be adulterated with water or the water may form by condensation in the tank which contains the petroleum product or gasoline. In any event it is desirable to separate the water, collect the water and automatically discharge the water from the tank containing the petroleum product or gasoline in a manner such that no petroleum product can possibly be discharged with the water, and in a manner such that when the discharge is opened it will remain open a considerable period of time and/or will discharge a relatively large proportion of the collected water or collected liquid of heavier specific gravity and thereafter automatically will close at a proper time so as constantly to maintain between the supernatant body of liquid petroleum or gasoline a relatively deep body of water or rather a sufficient body of water beneath or below the supernatant petroleum or gasoline whereby to prevent the outflow of the petroleum product or gasoline with the water. In short, the invention is arranged constantly to maintain a protective medium of liquid of heavier specific gravity, specifically water, between the outlet discharge of the supernatant liquid, whereby to prevent the discharge of the supernatant liquid, the invention operating in a manner to provide a relatively long period between the opening of the discharge valve and the closing of the discharge valve, whereby to avoid chattering, to wit, rapid opening and closing of a discharge valve is avoided.

In another aspect of the invention, it is associated with a service station internal combustion motor fuel dispensing device, wherein motor fuel such as gasoline or the like is adapted to be continuously drawn during the dispensing operation from an underground fuel containing reservoir, and conducted under pressure through a dispensing line, through measuring means, such, for instance, as a liquid displacement meter, and thence through a permanent flexible hose having a dispensing nozzle. The dispensing line is provided with dispensing flow control means, preferably in the form of a dispensing valve located in the dispensing nozzle, but the invention is not limited to such arrangement.

In the adaptation of my present invention to this combination I dispose in the dispensing line means for continuously separating water from the motor fuel as the motor fuel passes through the dispensing line, preferably in the dispensing operation, and in adidtion I associate, preferably with the separating means, water collecting means adapted continuously to collect the water which is continuously separated out and I associate with this water separating means control means and a water discharge port and valve. Therefore, the arrangement being such that as the water of heavier specific gravity than the motor fuel collects or accumulates in a body of sufficient depth below the supernatant liquid fuel, and the water level rises to a predetermined point, or reaches a predetermined height in the collecting means, devices are automatically actuated by the variation in columns of the liquids in the collecting means, whereby automatically to open the discharge valve and discharge a relatively large proportion of the liquid of heavier specific gravity, specifically the water, the discharge valve remaining open for a relatively long time for this purpose and automatically closing thereafter and maintaining constantly a sufficient body or depth of water or liquid of heavier specific gravity between the supernatant fuel and discharge valve, whereby to prevent the discharge of the fuel through the water discharge port.

By these means I avoid the constant, quick opening and closing of the water discharge valve which might be present if an arrangement were used which did not give a prolonged delay between the opening and closing of this valve. Such a construction would be objectionable in that in case of vibration in a movable carirer, the level of water between the supernatant fuel and the water might shift vertically and at one instant would open the valve and at another instant immediately following would close the valve. So also upon the rise of the water level in this latter construction to an operative height; the discharge valve would automatically and immediately be actuated to discharge the water; the water would recede slightly below the operating zone; the valve would immediately close and immediately upon the accumulation of additional water, the valve would open and close in rapid, quick acting cycles, thereby producing a chatter of the valve, due to this rapid opening and closing. All this would be objectionable.

In this latter aspect of the invention, I also provide interlocking means associated with water discharging means and preferably associated automatically with some element of the dispensing device, so that only when the dispensing pump is inoperative can the water discharging device operate or start. Otherwise, during the dispensing operation of gasoline from the nozzle, the water discharge valve is rendered inoperative, so that in the event of failure it will be impossible for fuel to be forced out of an open water discharge valve.

In the invention disclosed, the water to be discharged, being a conductor of electricity, is utilized through a proper switch mechanism and proper solenoids to operate the water discharge valve. In one of the modifications a single solenoid is used, whereas in another modification, a plurality of solenoids are used. So also in one of the modifications, the water discharge valve is located wholly outside of the water collecting chamber, whereby to prevent its free operation due to freezing conditions.

Referring to Fig. 1 of the drawings, my improved mechanism is shown as attached to any type of reservoir, container or storage tank 1 for petroleum products. The petroleum products may be of any desired type, including also liquid fuel for internal combustion engines. In the form shown, this tank may be provided at its top with a fuel cap 2 and provided with a discharge opening 3. The tank, preferably at its bottom, has attached thereto any type of a liquid collecting means, preferably in the form of a casting 5, which casting communicates with the contents of the tank through an opening 6. To the bottom of the casting 5 is attached a sump 7 by means of bolts 8 and enclosing the upper portion of this casting 5 a cover 9 is provided having screws 10 by which the cover is fastened in place. This cover 9 is arranged to provide a control chamber 11. In lieu of arranging the sump 7 in the manner shown, it may be formed in any convenient manner as a part of the tank 1 which is shown as an extension or continuation of the tank for purposes of convenience.

Disposed in the upper wall 12 of the water collecting means 5 are a plurality of control means, preferably two, hereunder specifically shown as electrodes. These electrodes have connecting points 13 and 14, connected up through attaching means 15 and 16 and are insulated from their metal adapters 17 by means of an insulator 18. As clearly shown, these two electrodes 13 and 14 are arranged in vertical space relation in the water and gasoline collecting or containing chamber, and it is particularly to be pointed out that they are relatively remotely placed vertically from each other, a sufficient distance apart to provide a requisite time interval between the opening and closing of the water discharge means which is actuated by these electrodes, as will be hereinafter more fully pointed out.

With these control means is a mechanism for actuating the water discharge valve hereinafter referred to. To this end, mounted in the casting 5, preferably on a wall 12 is a solenoid 19 connected between the electrical wires 20 and 21. This solenoid has an extending core 22 which is provided on its lower end with a water discharging valve 23 adapted to open and close a water discharge port disposed in the lower wall or bottom wall of the sump or water collecting means 7. This core 22 passes through the conventional type of packing gland 24. Through the core 22 a cotter pin 25 supports a washer 26 and compressed between the washer and the packing gland 24, there is an actuating spring 27 adapted to force the valve to normally closed position. The upper end of the core 22, through the instrumentality of a pin 28 is provided with one part of a switch mechanism 29, comprising a disk or body of insulating material having securely attached to its upper face a copper contact ring 30, adapted for engagement with a cooperative switch mechanism in the form of two spaced apart contacts 31 mounted on and insulated from the cover 9. In addition, any desired source of power G is provided and is attached to an electrical conductor 32. This wire 32 is connected to one of the contact points 31, while the branch 33 connects to the upper portion of the electrode 13. The other contact point 31 is connected by wire 34 to the upper end of electrode 14. Wire 21 connects between solenoid 19 and the upper wall 12.

In Fig. 1 the water is shown at a level such as at 35 and the valve 23 is closed. However, from condensation or other causes, water may accumulate in the sump 7 from a tank 1, the water instantly separating out due to its heavier specific gravity and accumulating in the bottom of the sump 7, below the level of the supernatant liquid petroleum product therein. Due to this steady accumulation, the water level will rise until it reaches the electrode 13. When the water has made contact or approaches within sufficient distance of this electrode to establish proper electrical conductivity, current will flow from a generator G through wire 32, and 33, through electrode 13 to the castings 5 and 12, from which it can flow through wire 21, through solenoid 19 and out to the ground by wire 20. This will then energize solenoid 19, causing it to draw core 22 upwardly and forcing the ring contact 30 to contact with the contact points 31. In so doing valve 23 will be automatically opened and water will discharge through the water discharge port. At the same time when the points 30 and 31 are closed, current will also flow through the wire 32, contact points 30 and 31 and through wire 34 to the electrode 14, passing through the water to the casting 5, which may return to the ground by means of the wire 21, solenoid 19 and wire 20.

Thus, it can be seen that as soon as the discharge valve has been opened by the water contacting the upper control means 13, the water level will immediately recede and break contact with the electrode 13. Due to the rise of this core 22 upon the opening of the discharge valve, the switch 30, 31 has been closed and through the latter described circui current will flow through the solenoid 19, thereby maintaining the discharge valve in open or raised position, and this solenoid will thus retain this valve in open position against the tension of the spring 27 until the water has fallen below the relatively remotely disposed lower electrode 14. When this occurs the circuit will be broken and the spring 27 will automatically close the valve 23. Thus it can be seen that this valve will not open again until the water level has again reached electrode 13. From the foregoing it will also be apparent that a considerable time interval will elapse from the opening of the discharge valve until it closes and it will also be evident that a considerable or relatively large proportion of the collected water will be discharged through the water discharge port before the valve is closed, and also that the valve will close in sufficient time constantly to maintain a blanket or protective body of water of sufficient depth between the discharge outlet and the level of the supernatant petroleum product or gasoline whereby to prevent inadvertent discharge of the petroleum product from the discharge port during the discharge of the water.

In Fig. 2 I have shown a modification of the switch structure adapted to operate in lieu of the switch shown in Fig. 1. In Fig. 2 I employ a mercury switch 40, which is pivoted on a pin 41 and has an extended arm 42 engaged by a collar 43 on the extended insulation core 44 of the core 22. This type of switch is more practical than the open contact type shown in Fig. 1.

In certain instances it is desirable to insure the discharge of water in cold weather by mounting the valve mechanism wholly exteriorly of the water collecting means. Fig. 3 shows such a modified form of the device wherein all moving parts are located wholly outside of the sump 7. In addition, an independent or additional electrode 45 is shown insulated from its support in the center of the discharge valve 46. Attached to this electrode 45 is a wire 47, the other end of which is attached to the solenoid 19. The valve 46 is supported on an extending arm pivoted on a pin 48. An opposite extending arm 49 is attached to the lower end of the core 22 by means of a yoke 50. Disposed between yoke 50 and the casting 51 is a compression spring 52 for closing the water discharge valve 46. The electrical wiring of the electrodes and other parts of this construction, Fig. 3, are identical with those shown in Fig. 2. In the operation of the device shown in Fig. 3 when the valve 46 is opened, liquid within the sump 7 will flow outwardly through the passage 53 and flow over electrode 45. The current through either circuit must flow between the electrode 45 and either electrode 13 or 14. In this structure, therefore, if for any reason any liquid other than water should drain outwardly the electrical connection between electrodes would be broken and the valve would instantly close.

Furthermore, in this construction in the event the water should freeze into a solid block of ice, the ice would be free to move upwardly because of the taper of the walls of the sump 7. Should the block of ice rise, gasoline or petroleum product could flow about the sides of the cake of ice and collect in the opening 53 about the electrode 45. In such an event, any further accumulation of ice by water on the upper surface of the ice cake would not cause the valve 46 to open due to the fact that electrical current could not make a passage through water or ice between the electrodes. In this manner the draining of oils or gasoline is precluded in the event of freezing.

In the modification shown in Fig. 4 I provide a construction employing two solenoids. The two electrodes and valve mechanism and other structure are similar to that shown in Fig. 1 and parts similar to those of Fig. 1 are numbered in corresponding figures. However, in this modification an additional solenoid 55 is disposed above the switch 30, 31 and is in axial alignment with solenoid 19. In this structure the positive wire 56 is attached to the solenoid 55 and switch contact points 31. The ground wire 57 is directly attached to the casting at 12. A wire 58 connects the solenoid 55 with the electrode connection 15. A wire 59 connects the electrode connection 16 to the solenoid 19, and a wire 60 is connected between the solenoid 19 and contact points 31. The solenoid 55 has a core which is an extension of the core 22, there being considerable insulation between. In the operation of this device, when the water level 35 reaches the electrode 13, the upper solenoid will be energized. The current in this circuit flows through wire 56, solenoid 55, wire 58, electrode 13, through the water to the casting 12. The wire 57 returns the current to the ground. Solenoid 55, thus energized, raises its core, valve and other associated parts, including switch element 30, causing a closed circuit between contacts 30 and 31. Upon the opening of the valve the water will recede and break contact with electrode 13, but since the switch 30, 31 has been closed the lower solenoid 19 will maintain the valve 23 open and the valve will remain in an upward open position until the water level has broken contact with the lower electrode 14, whereupon the valve will automatically close under the energy of its spring.

Figure 5:
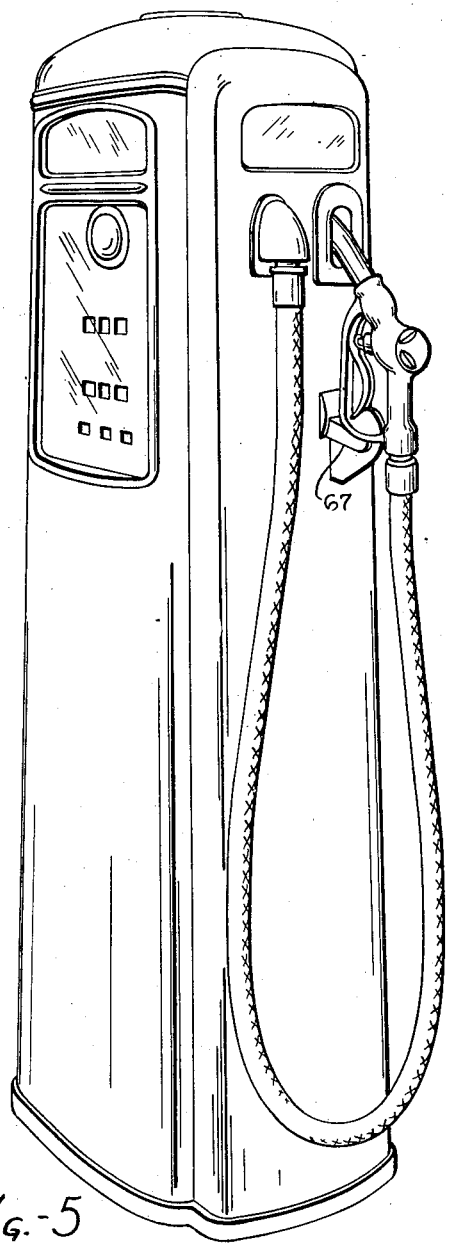
Fig. 5 is a perspective view of a service station gasoline pump of the conventional type and to which the invention is applicable.

Referring now to Figs. 5 and 6, which disclose the adaptation of my invention to a system for dispensing internal combustion motor fuel, I have shown the elements of a present-day type of conventional service station gasoline pump, the system being shown diagrammatically in Fig. 6, and the housing being shown in Fig. 5; enclosing the usual type of dispensing line, having its lowermost end provided with the usual type of foot valve, inserted in the usual type of underground reservoir, holding a quantity of motor fuel. This dispensing line connects with a water separator, preferably of the type shown in the patent application of Chester Oberly, Serial No. 253,486 and from the discharge side of the water separator the dispensing line connects with any type of liquid forcing pump, which, as shown, is operated by an electric motor. The discharge side of the pump is shown as discharging into a liquid displacement meter, which in turn discharges through the usual type of sight glass shown at the top of the figure and from thence through the conventional flexible hose, which is in turn provided with a valve nozzle.

Be it understood that the mechanism shown in

Fig. 6 is normally housed within the housing shown in Fig. 5. The meter is provided with the usual meter spindle, shown as driving the usual type of volume and/or price indicating means and preferably of a computing type.

In the adaptation of my invention to such a system, I have shown my water collecting and discharging mechanism associated with the water separator, the sump 7 being shown at the right hand lower portion of the water separator, and in this case the outlet of the water discharge is immediately behind the dispensing line and is of the type preferably shown in Fig. 1 and Fig. 4 of the drawings, except that the electrical wires, instead of being taken out on the top of the control cover, are brought out at the side. The wiring of this valve mechanism would be identical with that shown in Figs. 1, 3 or 4, but, in addition, a switch 65 has been added. The switch 65 and the electric motor switch 66 are adapted to be controlled by the same switch lever 67. In the manner shown they are connected by rods 68 and 69, so that they are alternately opened or closed. In short, when the motor switch 66 is closed by the rising of the switch lever 67, switch 65 will be held open and this will prevent the opening of the valve in the suction line of the pump, while the pump is operating. Likewise, when the switch lever 67 is in a downward position, the motor switch 66 is open and switch 65 will be closed, allowing the valve to open if the water level reaches the electrode 13. Hence, it will be seen that I have provided interlocking means for preventing operation of the water discharging means during the normal operation of the pump, and have utilized the conventional type of pump switch lever in association with the nozzle support for accomplishing this desirable interlock. The electrode device and discharge valve will be directly connected to a tank, in which event there would be no need for any other type or form of settling or collecting chamber and, therefore, in the specification and claims wherever the term "sump" or "means for collecting the accumulated water" is used it is to be understood that the same is meant to include an arrangement wherein the electrode device and discharge valve are directly attached to a tank.

The invention is hereby claimed as follows:

1. In a water separating and discharging device for tanks or reservoirs containing a petroleum product, in combination water collecting means adapted to form a collecting reservoir for the water underlying such petroleum product, a water discharge outlet for said water collecting means, a valve adapted to close said outlet, said valve having a core, a solenoid surrounding said core, and adapted on energization of said solenoid to shift said core and open said valve, a shiftable switch member carried by said core, normally open electrical contacts adapted to be closed by said shiftable switch member, upper and lower electrodes projecting into the reservoir formed by said water collecting means and terminating in vertically spaced relation, an electric circuit including a source of electric current, the upper of said electrodes and said solenoid and through which current flows upon the accumulation of water in said reservoir to the level of said upper electrode whereby to open the valve, an electric circuit including said source, the lower of said electrodes, said switch contacts and said solenoid and through which current flows while the water is above said lower electrode to maintain said valve in open position until the recession of the water below said lower electrode.

2. In combination with a tank adapted to hold petroleum product, a sump attached to the bottom portion of said tank and communicating with the interior of said tank, said sump having a water discharge outlet in its bottom, said sump having a cover, a pair of electrodes disposed in space relation in said cover and depending into said sump in vertical space relation, a packing gland disposed in said cover, a valve stem shiftably mounted in said packing gland and terminating in its lower end in a valve disposed to close said water discharge outlet, means for normally closing said valve, a solenoid mounted on said cover with its central opening in alignment with the valve stem, said valve stem having a projecting core portion passing through the opening of said solenoid, said core portion carrying an insulated electrical contact, a pair of normally opened contacts disposed for simultaneous engagement by said first mentioned contact, a source of electric current, and electric circuits including said source, said electrodes, said contacts and said solenoid and through which current flows upon accumulation of water in said sump to the level of the upper one of said electrodes for energizing said solenoid, and maintaining said solenoid energized until the level of the water falls below the lower one of said electrodes.

3. In a device of the class described in combination with a reservoir adapted to contain a petroleum product, said reservoir having a water discharge outlet, a pair of electrodes disposed in spaced vertical relation in said reservoir, a valve adapted to normally close said outlet, an electrode carried by said valve and arranged when said valve is in closed position to lie concentrically within said outlet a source of electric current, a solenoid for actuating said valve, one electric circuit for energizing said solenoid and including said source, the upper one of said pair of electrodes, the electrode carried by said valve and said solenoid and through which current flows upon the accumulation of water to the level of the upper electrode, and another electric circuit for maintaining said solenoid energized as the level of the water falls below said upper electrode and including said source, said contacts, the lower one of said electrodes, the electrode carried by said valve and said solenoid and through which current flows while the level of the water is above the lower one of said electrodes.

4. In a device of the class described in combination with a tank adapted to contain a liquid petroleum product, a water discharge outlet for said tank, a valve in said outlet for opening and closing said outlet, means rendered operative by water in said tank when the water accumulates to a predetermined level for opening said valve, means for moving said valve to closed position, means rendered operative by the water in said tank as the level thereof in said tank falls below said predetermined level to a second lower predetermined level for maintaining said valve in open position, and mechanism including control means carried by said valve and responsive to the passage of water and the liquid petroleum product over said valve for rendering said maintaining means effective to maintain the valve in open position while water flows through said outlet and over said valve and ineffective to maintain said valve in open position in the event the liquid petroleum product flows through said outlet and over said valve.

5. In a device of the class described in combination with a reservoir adapted to contain a liquid which is not electrically conductive, means for separating water from said liquid, comprising a water collecting chamber connected to said reservoir, a plurality of electrodes vertically spaced therein, a water discharge outlet for said water collecting means, valve opening means and valve closing means, means actuated by the rise of liquid into contact with at least one of said electrodes for opening said valve and means actuated by the flow of the first mentioned liquid out of said outlet for immediately causing the closure of said valve.

6. In a device of the class described in combination with a tank having an outlet and a valve therefor, said tank holding a liquid which is a non-conductor of electricity, said tank also holding water adapted to collect beneath said electrically non-conductive liquid, means for moving said valve to closed position, an electric actuator for moving said valve to open position, and a control circuit for said actuator comprising a source of electric energy and means rendered operative by water in said tank as the level of the water in said tank varies between predetermined limits for energizing said actuator from said source, and said control circuit also including electrode means disposed at the water discharge outlet and over which the liquid and water must flow to pass through said outlet for deenergizing said actuator upon passage of the electrically non-conducting liquid over said electrode means to permit movement of said valve to closed position by the valve closing means.

7. In a device of the class described in combination with a tank adapted to contain a quantity of liquid which is not electrically conductive, said tank also holding a liquid of heavier specific gravity than said first mentioned liquid, and which second mentioned liquid is electrically conductive, said tank having a liquid discharge outlet and a valve for closing said outlet, said valve being mounted wholly exterior of said tank, and valve operating means for said valve, including a pair of stationary electrodes disposed inside of said tank, said means including devices constructed and arranged to open said valve upon the accumulation of a predetermined volume of electrically conductive liquid within said tank, whereby to discharge said liquid.

8. In a device of the class described in combination with a reservoir adapted to contain a liquid which is not electrically conductive, a discharge outlet in the bottom of said reservoir, a valve normally closing said outlet, an electrode insulatedly carried by said valve, said electrode, when said valve is in open position, being disposed so that liquid discharging through said outlet will have to flow in contact with said electrode, a pair of electrodes depending in spaced relation into said reservoir, valve operating means including a source of current connected to said electrodes and including a solenoid for operating said valve actuating means to open said valve, the electrode carried by said valve, being associated with said electrically operated means and said solenoid, and constructed and arranged so that upon the opening of said valve and discharge of the liquid therethrough, which is electrically conductive, said valve will remain open until the liquid which is not electrically conductive contacts said electrode, whereupon said valve will be automatically closed by said valve operating mechanism.

9. In a device of the class described in combination with a reservoir adapted to hold a volume of petroleum product, a pair of electrodes mounted in depending vertically disposed relation within said reservoir, a water discharge outlet for the bottom of said reservoir, a spring pressed valve normally closing said outlet, said valve having an elongated stem, a pair of solenoids disposed in vertically spaced relation with their openings concentrically surrounding said elongated stem, a switch contact disposed on said stem between said solenoids, a pair of cooperating contacts in the path of movement of said switch contact, and electrical connections including a source of current, said electrodes, said solenoids and said pair of contacts.

PAUL E. WAUGH.